US012735099B2

(12) United States Patent
Wagner et al.

(10) Patent No.: US 12,735,099 B2
(45) Date of Patent: Sep. 15, 2026

(54) SENSOR DEVICE HAVING A TORQUE SENSOR UNIT AND A STEERING ANGLE SENSOR UNIT FOR A MOTOR VEHICLE

(71) Applicant: VALEO SCHALTER UND SENSOREN GMBH, Bietigheim-Bissingen (DE)

(72) Inventors: Thomas Wagner, Bietigheim-Bissingen (DE); Ekkehart Froehlich, Bietigheim-Bissingen (DE); Katalin Hadobas-Roessel, Bietigheim-Bissingen (DE); Roman Schoepe, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 162 days.

(21) Appl. No.: 18/709,514

(22) PCT Filed: Nov. 10, 2022

(86) PCT No.: PCT/EP2022/081403
§ 371 (c)(1),
(2) Date: May 13, 2024

(87) PCT Pub. No.: WO2023/088764
PCT Pub. Date: May 25, 2023

(65) Prior Publication Data

US 2025/0002081 A1 Jan. 2, 2025

(30) Foreign Application Priority Data

Nov. 17, 2021 (DE) ..................... 10 2021 129 981.0

(51) Int. Cl.
*B62D 6/10* (2006.01)
*B62D 15/02* (2006.01)
(Continued)

(52) U.S. Cl.
CPC ........... *B62D 6/10* (2013.01); *B62D 15/0215* (2013.01); *G01D 5/145* (2013.01); *G01L 3/1435* (2013.01);
(Continued)

(58) Field of Classification Search
CPC .. B62D 6/10; B62D 15/0215; G01D 2205/28; G01D 2205/26; G01D 5/145; G01L 3/1435; G01L 5/221
(Continued)

(56) References Cited

U.S. PATENT DOCUMENTS 6,418,369 B2 * 7/2002 Matsumoto ............. B60T 8/172
180/197
8,015,885 B2 * 9/2011 Arita ....................... G01L 3/104
73/862.333
(Continued)

FOREIGN PATENT DOCUMENTS

CN 102889852 A 1/2013
CN 103154687 A 6/2013
(Continued)

OTHER PUBLICATIONS

International Search Report issued in corresponding International Application No. PCT/EP2022/081403 mailed Mar. 7, 2023 (5 pages).

(Continued)

*Primary Examiner* — Peter J Macchiarolo
*Assistant Examiner* — Monica S Young
(74) *Attorney, Agent, or Firm* — Osha Bergman Watanabe & Burton LLP

(57) ABSTRACT

A sensor device is disclosed. The sensor device includes a torque sensor unit and a steering angle sensor unit for a motor vehicle. The torque sensor unit is configured to detect a torque which is applied to a steering shaft, rotatable about
(Continued)

Figure 1:
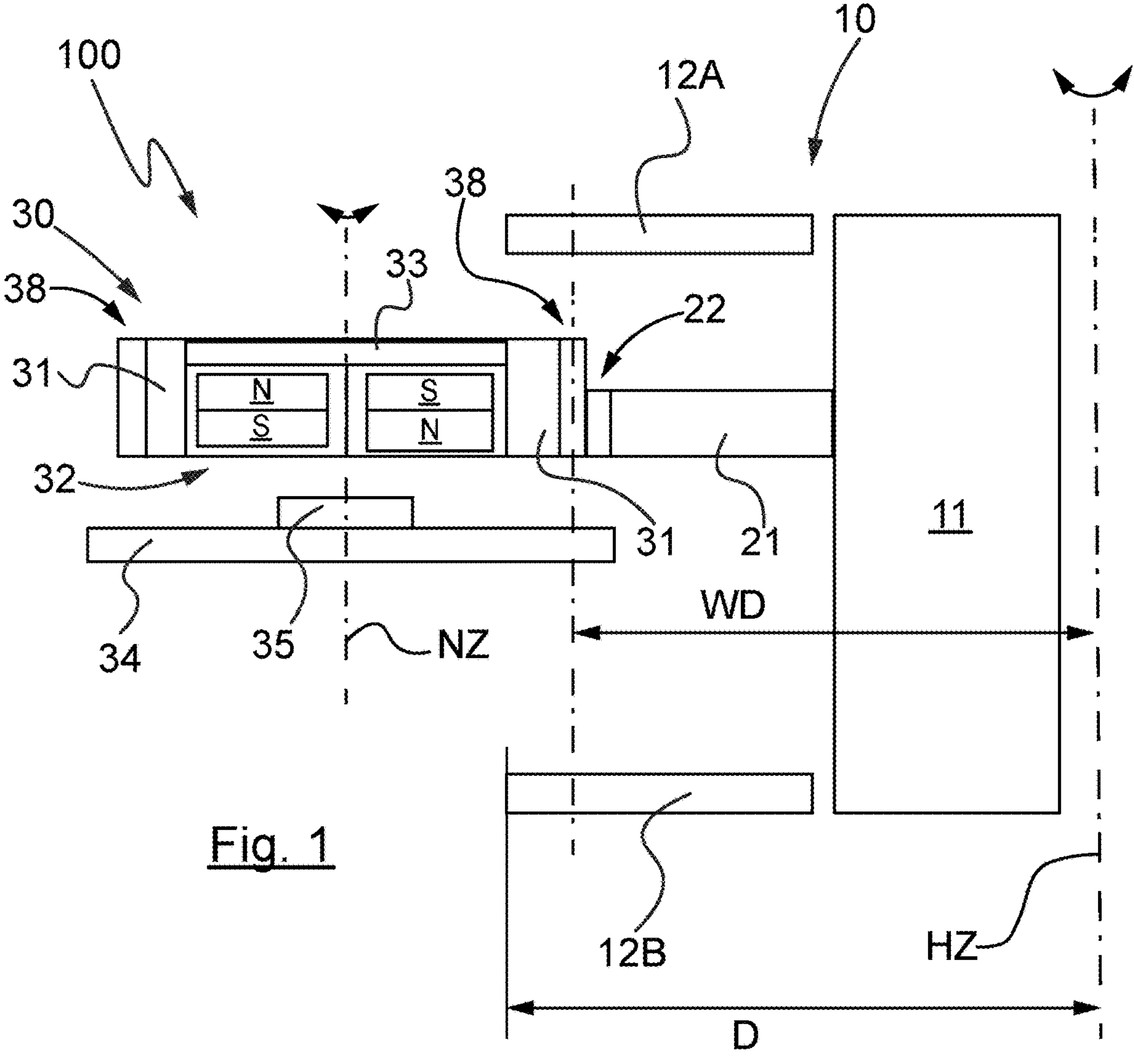

a main axis of rotation. The torque sensor unit includes at least one torque sensor magnetic unit to generate a torque sensor magnetic field and at least one torque magnetic sensor to generate a torque sensor signal as a function of a torque applied to the shaft. The steering angle sensor unit is configured to detect a rotary angle of the shaft. The steering angle sensor unit includes a main rotor, a first secondary rotor, and a first steering angle magnetic sensor.

14 Claims, 5 Drawing Sheets

(51) Int. Cl.
*G01D 5/14* (2006.01)
*G01L 3/14* (2006.01)
*G01L 5/22* (2006.01)

(52) U.S. Cl.
CPC .......... *G01L 5/221* (2013.01); *G01D 2205/26* (2021.05); *G01D 2205/28* (2021.05)

(58) Field of Classification Search
USPC ..................................................... 73/862.331
See application file for complete search history.

(56) References Cited

U.S. PATENT DOCUMENTS 8,666,562 B2 * 3/2014 Tuononen ........... B60W 40/068 701/1
10,845,259 B2 11/2020 Toyama
12,134,391 B2 * 11/2024 Nouri .................... B60W 40/12
2003/0222643 A1 * 12/2003 Okuma ................ G01D 11/245 324/207.25
2011/0043198 A1 * 2/2011 Ruetz ................. B62D 15/0245 324/207.25
2012/0179327 A1 * 7/2012 Yngve ................ B60W 40/064 701/32.9
2020/0307694 A1 * 10/2020 Toyama ................... B62D 5/04

FOREIGN PATENT DOCUMENTS

CN 106794870 A 5/2017
DE 102005038516 A1 2/2007
DE 102008063951 A1 * 6/2010 ............... G01D 5/04
DE 102015216009 A1 2/2017
DE 102017103877 A1 8/2018
EP 2603774 A1 6/2013
EP 2743662 A1 6/2014
EP 2603774 B1 * 3/2015 ............... G01L 5/22
JP 2000283704 A 10/2000
JP 2009145076 A * 7/2009
WO 2012/019947 A1 2/2012

OTHER PUBLICATIONS

Written Opinion issued in corresponding International Application No. PCT/EP2022/081403 mailed Mar. 7, 2023 (7 pages).
German Search Report issued in corresponding German Patent Application No. 10 2021 129 981.0 mailed Oct. 14, 2022 (7 pages).
Office Action issued by the CNIPA for corresponding Chinese Patent Application No. 202280076464.3, mailed Jul. 18, 2026 (13 pages).

* cited by examiner

SENSOR DEVICE HAVING A TORQUE SENSOR UNIT AND A STEERING ANGLE SENSOR UNIT FOR A MOTOR VEHICLE

The present invention relates to a sensor device having a torque sensor unit and a steering angle sensor unit for a motor vehicle. The torque sensor unit is set up to detect a torque which is applied to a shaft, in particular a steering shaft, rotatable about a main axis of rotation, and has at least one torque sensor magnetic unit to generate a torque sensor magnetic field and at least one torque magnetic sensor to generate a torque sensor signal as a function of a torque applied to the shaft. The steering angle sensor unit is set up to detect a rotary angle of the shaft and has a main rotor which can be connected for conjoint rotation and thus in a rotationally synchronous manner to the shaft, a first secondary rotor which is mechanically coupled to the main rotor with a constant and uniform transmission ratio, a first steering angle magnetic unit which is assigned to the first secondary rotor to generate a first steering angle magnetic field, and a first steering angle magnetic sensor which is assigned to the first secondary rotor to generate at least one first sensor signal as a function of a rotary angle of the main rotor.

Furthermore, the present invention relates to a secondary rotor assembly for such a sensor device, wherein the secondary rotor assembly comprises a secondary rotor, a steering angle magnetic unit connected for conjoint rotation to the secondary rotor to generate a steering angle magnetic field, and a magnetic shielding unit having at least one flat magnetic shielding element which extends in a plane perpendicular to the axis of rotation of the secondary rotor.

Sensor devices of the type in question, hereinafter also referred to as "combined sensor devices", which are designed for use in a motor vehicle and which have both a torque sensor unit, in particular a magnetic torque sensor unit, and a steering angle sensor unit, in particular likewise a magnetic steering angle sensor unit, are known in principle from the prior art.

The torque sensor unit is generally used to detect a steering torque applied to the steering shaft by a driver, particularly in electric steering systems, in order to actuate the electric drive motor of the steering system based on the steering torque applied by the driver, for example in order to be able to provide a corresponding, situation-adapted steering assistance.

Generally, torque sensor units are used with a torsion bar of defined, known torsional rigidity, wherein the torsion bar connects a first part of the axially divided shaft to a second part of the axially divided shaft. If a torque is applied to the shaft, this causes twisting of the two parts of the shaft with respect to each other by a measurable angle of twist, wherein the angle of twist arises in a manner dependent on the applied torque and the rigidity of the torsion bar, and therefore the applied torque can be determined from the detected angle of twist if the rigidity of the torsion bar is defined and known.

Various measuring principles and sensor arrangements are known for measuring the rotary angle resulting from an applied torque, wherein magnetic sensor systems are generally used in which a rotating ring magnet, usually designed as a permanent magnet, is connected to the first part of the steering shaft as part of a magnetic device and in which a stator unit with a stator holder, to which two magnetically conductive stator elements are usually attached, is connected for conjoint rotation to the second part of the shaft. The stator unit, in particular the two stator elements, are usually arranged concentrically around the ring magnet of the magnet device in a radial direction with a small air gap. Via the stator unit, in particular the two stator elements, the magnetic flux of the ring magnet of the magnet device can be conducted to a torque magnetic sensor, for example a Hall sensor, in particular with the aid of additional components in the form of so-called flux conductors, and the generated signal can be evaluated to determine the applied torque. If the ring magnet connected for conjoint rotation to the first part of the shaft is moved by a rotational movement of the shaft relative to the stator unit connected to the second part of the shaft, the magnetic flux density in the stator elements changes, which can be detected by means of the torque magnetic sensor. The change in the magnetic flux density in the stator depends, among other things, on the magnitude of the relative movement of the ring magnet with respect to the stator unit, i.e., the angle of twist. A conclusion can thus be drawn regarding the angle of twist from the change in the detected flux density and, from the angle of twist in turn, with knowledge of the torsional rigidity of the torsion bar, the torque applied to the shaft can be determined.

The steering angle sensor unit is generally used to detect a steering angle applied by the driver. Steering angle sensor units are frequently used which have a transmission with a main rotor with external gearing which is or can be connected for conjoint rotation to the steering shaft and at least one or two secondary rotors, also with external gearing, each of which meshes with the main rotor. The two secondary rotors are usually two smaller gear wheels, each of which has a permanent magnet connected for conjoint rotation, wherein each permanent magnet is assigned a corresponding steering angle magnetic sensor, in relation to which the secondary rotors can be rotated.

The rotary movement of the steering shaft can be transmitted to the permanent magnet, which is connected to the secondary rotor, via the main rotor, which is connected for conjoint rotation to the steering shaft, and the secondary rotors, which mesh with it. When the permanent magnets of the secondary rotors rotate, a magnetic flux of the assigned magnetic fields changes depending on the rotary angle, which can be detected using the assigned steering angle magnetic sensors. The transmission ratio between the secondary rotors and the main rotor can be used to determine the rotary angle of the steering shaft.

One challenge with these combined sensor devices is to prevent so-called "crosstalk", i.e., a mutual interference of the magnetic fields of the torque sensor unit and the steering angle sensor unit by a "scattering" of a respective stray magnetic field component of the torque sensor magnetic field into the steering angle sensor magnetic field and a stray magnetic field component of the steering angle sensor magnetic field into the torque sensor magnetic field, or to reduce it to a level required for the desired sensor accuracy.

In order to reduce or prevent mutual interference between the magnetic fields of the torque sensor unit and the steering angle sensor unit, magnetic shielding units with at least one shielding element are generally used. Various structural designs are known from the prior art, for example from US 2020/0307694 A1, WO 2012/019947 A1 or EP 2 743 662 A1.

Against this background, it is an object of the present invention to provide an alternative sensor device, in particular an improved sensor device, which in particular enables a more compact design, preferably with a constant or improved magnetic shielding between the torque sensor unit and the steering angle sensor unit.

This object is achieved according to the invention by a sensor device and by a secondary rotor assembly having the features according to the respective independent claims. Advantageous embodiments of the invention are the subject matter of the dependent patent claims, of the description and of the figures. The wording of the claims is made part of the content of the description by express reference.

A sensor device according to the present invention has a torque sensor unit and a steering angle sensor unit and is designed for use in a motor vehicle. The torque sensor unit is set up to detect a torque which is applied to a shaft, in particular a steering shaft, rotatable about a main axis of rotation, and has at least one torque sensor magnetic unit to generate a torque sensor magnetic field and at least one torque magnetic sensor to generate a torque sensor signal as a function of a torque applied to the shaft. The steering angle sensor unit is set up for detecting a rotary angle of the shaft and has a main rotor which can be connected for conjoint rotation and thus in a rotationally synchronous manner to the shaft, a first secondary rotor coupled mechanically to the main rotor with a constant and uniform first transmission ratio, a first steering angle magnetic unit assigned to the first secondary rotor to generate a first steering angle magnetic field, and a first steering angle magnetic sensor assigned to the first secondary rotor to generate at least one first sensor signal as a function of a rotary angle of the main rotor. The first secondary rotor is rotatable relative to the first steering angle magnetic sensor about a first axis of rotation running parallel to the main axis of rotation, wherein the first steering angle magnetic unit is connected for conjoint rotation and thus in a rotationally synchronous manner to the first secondary rotor, i.e., rotates with it. The sensor device also has a magnetic shielding unit with at least one flat first magnetic shielding element, which extends in a plane perpendicular to the first axis of rotation, in order to shield the torque sensor magnetic field of the torque sensor unit and the first steering angle magnetic field of the steering angle sensor unit at least partially from one another, wherein the first shielding element is arranged in the axial direction on a side of the first steering angle magnetic unit facing away from the first steering angle magnetic sensor.

A sensor device according to the invention is characterized in that the first magnetic shielding element is attached for conjoint rotation to the first secondary rotor.

By attaching the magnetic shielding element to the secondary rotor in accordance with the invention, a compact arrangement of a combined sensor device with a torque sensor unit and a steering angle sensor unit can be achieved, in particular with a low installation space requirement in the axial direction, as well as good shielding. In particular, interference of the torque sensor magnetic field by the first steering angle magnetic sensor device can be reduced or, if the magnetic shielding unit is designed accordingly, even almost completely avoided or completely avoided.

Furthermore, in many cases the useful field of the first steering angle magnetic unit can be improved by the particularly close arrangement of the shielding element to the first steering angle magnetic unit that can be achieved in this way. In particular, a more favorable operating point of the first steering angle magnetic unit can be achieved, whereby a stronger first steering angle magnetic field can be realized with the same volume or spatial requirement of the first steering angle magnetic unit. At the same time, a higher stability of the first steering angle magnetic unit against demagnetization or aging can also be achieved.

The torque sensor magnetic unit of the torque sensor unit of a sensor device according to the invention is preferably designed as is usual for torque sensor units of the type in question known from the prior art. For further details, in particular with regard to the basic mode of operation, please refer to the relevant prior art. In principle, the torque sensor unit of a sensor device according to the invention can be designed as described above in conjunction with the explanation of the prior art.

The steering angle sensor unit of a sensor device according to the invention is preferably also basically designed in the manner known from the prior art, wherein reference is also made to the relevant prior art for further information, in particular with regard to detailed explanations of the possible design and mode of operation of the steering angle sensor unit. In principle, the steering angle sensor unit of a sensor device according to the invention can be designed as described above in conjunction with the explanation of the prior art.

In an advantageous embodiment of a sensor device according to the present invention, the steering angle sensor unit further comprises, in particular, at least one second secondary rotor mechanically coupled to the main rotor with a constant and uniform transmission ratio, a second steering angle magnetic unit which is assigned to the second secondary rotor to generate a second steering angle magnetic field, and a second steering angle magnetic sensor which is assigned to the second secondary rotor to generate at least one second sensor signal depending on a rotary angle, wherein the second secondary rotor is preferably rotatable relative to the second steering angle magnetic sensor about a second axis of rotation running parallel to the main axis of rotation and the second steering angle magnetic unit is connected for conjoint rotation and thus in a rotationally synchronous manner to the second secondary rotor. This can achieve improved steering angle detection, in particular more precise steering angle detection.

Particularly preferably, the magnetic shielding unit also comprises at least one flat second magnetic shielding element extending in a plane perpendicular to the second axis of rotation in order to shield the torque sensor magnetic field of the torque sensor unit and the second steering angle magnetic field of the steering angle sensor unit at least partially from one another, wherein the second magnetic shielding element is preferably arranged in the axial direction on a side of the second steering angle magnetic unit facing away from the second steering angle magnetic sensor and is attached for conjoint rotation to the second secondary rotor. In this way, a compact arrangement of a combined sensor device with a torque sensor unit and a steering angle sensor unit can also be achieved with a second secondary rotor, in particular furthermore with a low installation space requirement in the axial direction, as well as good shielding. In particular, interference of the torque sensor magnetic field by the second steering angle magnetic sensor device can be reduced or, if the magnetic shielding unit is designed accordingly, even likewise almost completely avoided or completely avoided.

In particular, the second secondary rotor or a corresponding second secondary rotor assembly can be designed in the same way as the first secondary rotor, wherein the second secondary rotor preferably also rolls on the main rotor or, in the case of intermeshing with the main rotor, in particular also meshes with the main rotor. In particular, the first secondary rotor and the second secondary rotor each roll in the same plane. In principle, however, the first secondary rotor and the second secondary rotor can also roll on the main rotor in different axial planes. However, this requires more installation space in the axial direction, in particular a higher main rotor. However, in some cases this means that less installation space is required in the radial direction. Particularly preferably, the second secondary rotor is mechanically coupled to the main rotor with a constant and uniform second transmission ratio that is different from the first transmission ratio between the first secondary rotor and the main rotor. This enables particularly advantageous steering angle detection, in particular steering angle detection with a high degree of accuracy.

In particular, the second secondary rotor of the steering angle sensor unit enables the rotary angle of the main rotor and thus of the shaft to be determined using the Vernier principle in a manner known from the prior art.

In a further possible and advantageous embodiment of a sensor device according to the present invention, at least one steering angle magnetic unit has a 4-pole, in particular cylindrical, permanent magnet or is such a permanent magnet, wherein the permanent magnet is arranged in particular concentrically to the assigned axis of rotation of the secondary rotor. Preferably, the four poles of the permanent magnet are distributed over two planes and neighboring poles in particular each have a different polarity. Such an arrangement allows a particularly advantageous useful magnetic field to be generated for rotary angle detection. For example, in a cylindrical permanent magnet, the four poles can each extend over half the height of the cylinder and can be semi-circular in shape or each comprise one half of the cylinder, which extends over half the height of the cylinder.

In a further possible and advantageous embodiment of a sensor device according to the present invention, at least one shielding element, in particular the first shielding element and/or the second shielding element, is arranged so close to the assigned steering angle magnetic unit, in particular so close to the permanent magnet, that at least one air gap in the axial direction along the axis of rotation of the assigned secondary rotor between the steering angle magnetic unit and the assigned flat shielding element is less than 2 mm, in particular less than 1.5 mm, 1 mm, 0.5 mm or 0 mm.

By arranging the shielding element close to the steering angle magnetic unit in this way, a particularly compact arrangement of the steering angle sensor unit and thus of the entire sensor device can be achieved, especially in the axial direction, which means that particularly little installation space is required in the axial direction.

Furthermore, a particularly advantageous useful field of the steering angle magnetic unit shielded in this way can be achieved. In particular, a particularly favorable operating point of the respective steering angle magnetic unit can be achieved, whereby a stronger magnetic field can be achieved with the same volume or spatial requirement of the steering angle magnetic unit. At the same time, a particularly high stability of the steering angle magnetic unit shielded in this way can be achieved against demagnetization or aging.

In a particularly preferred embodiment, at least one shielding element can also lie directly against the assigned steering angle magnetic unit, i.e., can be attached to the secondary rotor with direct contact to the assigned steering angle magnetic unit, in particular can be introduced or inserted into the secondary rotor with direct contact. This makes it possible to achieve a particularly compact, installation-space-saving configuration in the axial direction.

In a further possible and advantageous embodiment of a sensor device according to the present invention, at least one secondary rotor, in particular the first secondary rotor and/or the second secondary rotor, has a hollow cylindrical shaft, wherein the assigned steering angle magnetic unit is preferably arranged in the interior of the shaft and, in particular, an outer surface of the shaft, i.e., an outer lateral surface of the shaft, at least partially forms a bearing surface, in particular a plain bearing surface, for the rotatable mounting of the secondary rotor within the sensor device, in particular for guiding the secondary rotor in the radial direction during a rotation about the assigned axis of rotation of the secondary rotor. In this way, a particularly space-saving mounting of the secondary rotor can be achieved in a simple manner. To reduce friction, a corresponding friction-reducing coating can be applied to the bearing surface or the shaft can be made of a friction-reducing material.

In a further possible and advantageous embodiment of a sensor device according to the present invention, in particular at least one secondary rotor is formed from plastic and manufactured by injection molding, wherein the assigned shielding element and/or the assigned steering angle magnetic unit preferably have been connected for conjoint rotation to the secondary rotor by at least partial overmolding and in particular form a secondary rotor assembly with the secondary rotor. This enables a particularly simple and cost-effective production of a secondary rotor assembly, in particular a type of pre-assembly of a secondary rotor assembly. This, in turn, enables particularly simple mounting of the sensor device to be achieved.

In particular, the secondary rotor assembly can be a 3-part assembly or a 3-part component, i.e., an assembly that is composed of three separate components or a component that is integrally manufactured from three different materials.

At least one magnetic shielding element, in particular the first magnetic shielding element and/or the second magnetic shielding element, is preferably made of a ferromagnetic material, wherein at least one magnetic shielding element can be a metal shielding plate made of a ferromagnetic material.

At least one steering angle magnetic unit is preferably made of a magnetizable material, in particular a ferromagnetic material. In particular, the steering angle magnetic unit is made of a different material than the assigned magnetic shielding element.

At least one secondary rotor is preferably made of plastic, in particular of a non-magnetic, non-magnetically conductive and non-electrically conductive plastic.

Alternatively, at least one steering angle magnetic unit and an assigned shielding element can also be inserted into a secondary rotor produced by injection molding and secured against falling out, and connected for conjoint rotation to the secondary rotor other than by overmolding, for example by clipping or latching, caulking or gluing, a combination thereof or the like.

Alternatively, the secondary rotor assembly can also be a 2-part assembly or a 2-part component, wherein the secondary rotor can also be made of magnetic material, for example, in particular of metal, ferromagnetic material, for example of the same material as the assigned steering angle magnetic unit and, in particular, can be formed in one piece with the assigned steering angle magnetic unit and can form a common component with the steering angle magnetic unit.

Alternatively, the secondary rotor can also be made of the same material as the assigned magnetic shielding element and can form a common component with it. However, the secondary rotor and the steering angle magnetic unit can also be made of a magnetic or magnetizable plastic, in particular by injection molding.

It is also conceivable to design the secondary rotor assembly as a 1-part assembly or component, and to manufacture the secondary rotor, the assigned steering angle magnetic unit and the assigned magnetic shielding element from one and the same material, in particular in one piece, i.e., in one piece or as a common component. This is particularly easy in the injection molding process with a magnetizable plastic or with a plastic that is filled with magnetic particles or magnetizable particles, wherein the resulting component, which in this case in particular forms a one-piece secondary rotor assembly according to the invention, is preferably magnetized or magnetically formed only in the center around the assigned axis of rotation of the secondary rotor. In this way, a small, local useful magnetic field can be provided as a steering angle magnetic field, which is sufficient for steering angle sensor detection, but at the same time does not generate an excessively large stray or interference magnetic field that interferes with torque detection.

In a further possible and advantageous embodiment of a sensor device according to the present invention, in particular at least one secondary rotor, in particular the first secondary rotor and/or the second secondary rotor, has at least one axial stop at an end of the shaft facing away from the assigned steering angle magnetic sensor, wherein the assigned shielding element is arranged between the axial stop and the assigned steering angle magnetic unit arranged inside the shaft. This makes it particularly easy to position the shielding element and/or the steering angle magnetic unit within the secondary rotor. This in turn enables simple assembly, in particular simple pre-assembly, of a secondary rotor assembly, especially if it is assembled from individually manufactured components.

In a further possible and advantageous embodiment of a sensor device according to the present invention, in particular in a development, the axial stop is formed by a projection extending inwards in the radial direction or by a shoulder of a groove formed in the radial direction in an inner surface of the shaft. This makes it easy to design and manufacture an axial stop for positioning and/or axially fixing the shielding element in the secondary rotor in at least one direction.

In particular, if the secondary rotor is manufactured by overmolding the shielding element and/or the assigned steering angle magnetic unit, the shaft can also have two or more axial stops in the finished state in order to fix the shielding element and/or the assigned steering angle magnetic unit in the axial direction on or in the secondary rotor, i.e., to fix it in place.

If, on the other hand, a secondary rotor assembly consisting of secondary rotor, shielding element and assigned steering angle magnetic unit is composed of individual components, preferably only one axial stop is provided to limit an axial movement of these two components in a first direction in the secondary rotor, so that the shielding element and/or the steering angle magnetic unit can be pushed into the shaft in an axial direction, particularly from one side. In this case, however, at least one latching element, clip or the like is preferably provided in order to axially fix the shielding element and/or the assigned steering angle magnetic unit after insertion, even against the push-in or insertion direction, or to secure it in its respective position in the axial direction.

In a further possible and advantageous embodiment of a sensor device according to the present invention, the sensor device, in particular the steering angle sensor unit, further comprises a housing portion which at least partially surrounds the steering angle sensor unit, wherein in a particularly advantageous embodiment of a sensor device according to the present invention, the secondary rotor is rotatably mounted in the housing about the assigned axis of rotation via the outer surface of the shaft, which at least partially forms the bearing surface. This enables a particularly simple and compact mounting of the secondary rotor in the sensor device and thus a particularly advantageous mounting, which in particular enables the realization of a particularly compact sensor device.

The housing portion preferably has an upper part and a lower part, wherein the secondary rotor is particularly preferably mounted in the upper housing portion via the outer surface of its shaft, in particular by means of a plain bearing. This makes it possible to achieve a particularly simple and compact mounting of the secondary rotor in the sensor device and thus a particularly compact sensor device.

In a further possible and advantageous embodiment of a sensor device according to the present invention, the sensor device furthermore has, in particular, at least one further shielding element which is preferably arranged in the axial direction on a side of at least one steering angle magnetic sensor facing away from at least one steering angle magnetic unit and/or a further shielding element is arranged in the axial direction on a side of the first steering angle magnetic unit facing away from the first steering angle magnetic sensor.

At least one shielding element of the sensor device in particular is of full-surface design, preferably is solid, i.e., has no recesses or cut-outs. In principle, however, it is also conceivable to use a shielding element which, for example, has a recess, such as a hole or similar, for example in the middle, or even a hole pattern or is designed as a grid. The only important thing is that the desired shielding effect is achieved.

Preferably, at least one shielding element is flat, wherein the first shielding element, the second shielding element and the at least one further shielding element are each particularly preferably flat, for example formed as a flat shielding plate. Alternatively, one or more shielding elements can also be at least slightly curved.

In some cases, a non-planar and/or non-full-surface or non-solid shielding element can also achieve an advantageous or in some cases even an improved shielding effect, depending on the required influence on the magnetic field(s) to reduce the interference influence.

If the at least one steering angle magnetic sensor is arranged on a printed circuit board, in particular on a rigid printed circuit board, the at least one further shielding element is preferably arranged on a side of the printed circuit board that faces away from the at least one steering angle magnetic sensor.

In particular, the at least one further shielding element can be inserted or placed into a housing portion alone or together with the printed circuit board and fastened in a corresponding housing portion, for example by latching, clipping, gluing or caulking or a combination thereof or the like.

In particular, the at least one further shielding element can be inserted together or alone with the printed circuit board in the lower housing part of a housing portion and in particular be attached to the latter, which at least partially surrounds at least the steering angle sensor unit, wherein particularly preferably at least one secondary rotor is at least partially rotatably mounted in an assigned upper housing part of the housing portion. Alternatively or additionally, the printed circuit board and/or at least one further shielding element can also be attached in the housing portion, in particular a lower housing part of the housing portion, by overmolding.

Alternatively, the additional shielding element can also be soldered directly onto the printed circuit board, in particular onto the underside of the printed circuit board.

In a particularly advantageous embodiment of a sensor device according to the present invention, at least one further shielding element is designed to at least partially shield both a first steering angle magnetic sensor and a second steering angle magnetic sensor, wherein the further shielding element is preferably arranged to overlap both the first steering angle magnetic sensor and the second steering angle magnetic sensor in the radial direction and, in particular, extends beyond the extent of the respective steering angle magnetic sensors in a plane perpendicular to the respective axes of rotation of the assigned secondary rotors.

In a further possible and advantageous embodiment of a sensor device according to the present invention, the torque sensor unit has in particular a stator unit with a first stator and a second stator, wherein each stator has an annular disk-shaped stator body which extends in the radial direction in a plane perpendicular to the main axis of rotation, and wherein at least one shielding element is arranged in the axial direction between the stator bodies of the two stators. Such an arrangement enables particularly good shielding to be achieved with a particularly compact arrangement of the individual components of the sensor device, which in particular requires only a small installation space in the axial direction.

Preferably, as is generally known and customary, the two stators also each have a plurality of stator lugs which are evenly distributed in the circumferential direction and which extend at least partially in the axial direction, in particular at least substantially parallel to the main axis of rotation, wherein the stator lugs of the first stator and the lugs of the second stator intermesh with one another in the axial direction in a manner similar to a toothing.

In a particularly advantageous embodiment of a sensor device according to the invention, at least the first shielding element, the first secondary rotor and the assigned first steering angle magnetic unit, which is connected for conjoint rotation to the secondary rotor, are arranged in the axial direction between the two stator bodies. This makes it possible to achieve a particularly compact configuration of the sensor device in the axial direction.

Preferably, if the steering angle sensor unit has a second secondary rotor, a second steering angle magnetic unit and a second shielding element, these components are also arranged in the axial direction between the two stator bodies.

Furthermore, it is particularly preferred that the first shielding element and/or the second shielding element and/or at least one further shielding element is arranged at least partially overlapping in the radial direction with at least one stator body. Such an arrangement also enables a compact design of the sensor device with good shielding in the radial direction.

In an advantageous embodiment of a sensor device according to the present invention, the main rotor and at least one secondary rotor preferably form a transmission, in particular a friction gearing or an externally toothed gear transmission. As a result, an advantageous steering angle sensor unit can be provided in a particularly simple manner.

In a further possible and advantageous embodiment of a sensor device according to the present invention, in particular in a development, the main rotor and the at least one secondary rotor roll against each other in particular in such a way that a pitch circle diameter of the main rotor is smaller than an outer diameter of at least one stator body. Such an arrangement makes it possible to achieve a particularly compact arrangement that requires very little installation space in the axial and radial directions.

The axis of rotation of the secondary rotor preferably runs centrally through the assigned steering angle magnetic sensor, in particular in the radial direction outside the stator body, in particular in such a way that the steering angle magnetic sensor does not overlap with one of the stator bodies in the radial direction. As a result, the interference of the torque sensor unit on the steering angle magnetic sensor can be kept particularly low.

However, if the shielding of the first steering angle magnetic sensor is sufficiently good, the first steering angle magnetic sensor can also be arranged to at least partially overlap with at least one stator body in the radial direction or the assigned secondary rotor can be arranged so far radially inwards that the assigned axis of rotation of the secondary rotor passes through the stator body or bodies in each case, in particular perpendicularly. This makes it possible to achieve a particularly compact radial arrangement and thus a sensor device that requires little installation space in the radial direction.

In a further possible and advantageous embodiment of a sensor device according to the present invention, in particular in a development, the sensor device is designed, in particular the first shielding element and/or the second shielding element and/or at least one further shielding element, in such a way that the magnetic field lines of a stray magnetic field which is generated by the steering angle magnetic unit and which strays into the stator unit is designed in magnitude and direction and is introduced into the stator unit in such a way that the stray magnetic field component which is introduced into the first stator and the stray magnetic field component which is introduced into the second stator cancel each other out in the stator unit or in the torque sensor unit or at the magnetic sensor of the torque sensor unit, at least almost, in particular completely. As a result, the stray field influence of the steering angle magnetic field on the torque sensor magnetic field can be significantly reduced, or even almost completely reduced if the magnetic shielding unit is designed accordingly. This has a beneficial effect on the torque sensor accuracy.

A secondary rotor assembly according to the invention for a sensor device according to the invention has a secondary rotor, a steering angle magnetic unit connected for conjoint rotation to the secondary rotor to generate a steering angle magnetic field, and a magnetic shielding unit with at least one magnetic shielding element which is formed flat and extends in a plane perpendicular to the axis of rotation of the secondary rotor, and is characterized in that the magnetic shielding element is arranged in the axial direction on a side of the steering angle magnetic unit which faces away from a side intended for the arrangement of a steering angle magnetic sensor, and is attached for conjoint rotation to the secondary rotor.

A secondary rotor assembly designed in accordance with the invention makes it possible to provide a simply designed and, in the axial direction, particularly compact combined sensor device with a magnetic torque sensor unit and a magnetic steering angle sensor unit, which, despite its compact design, enables good shielding between the torque sensor unit and the steering angle sensor unit, thanks to the attachment, for conjoint rotation, of the magnetic shielding element. The shielding designed and arranged according to the invention, in particular the non-rotatable arrangement of the first shielding element on the secondary rotor according to the invention, makes it possible to provide a sensor device with a low stray field influence and consequently with a high sensor accuracy with little effort.

The preferred embodiments and the advantages thereof presented with reference to a sensor device according to the invention consequently also apply accordingly to a secondary rotor assembly according to the invention.

Further features of the invention can be found in the claims, the figures, and the description of the figures. All of the features and combinations of features that are cited in the description above, and also the features and combinations of features that are cited in the description of the figures below and/or as shown in the figures alone, can be used not only in the respectively indicated combination but also in other combinations or on their own.

The invention will now be explained in more detail on the basis of preferred, non-limiting exemplary embodiments and with reference to the accompanying drawings.

Figure 2:
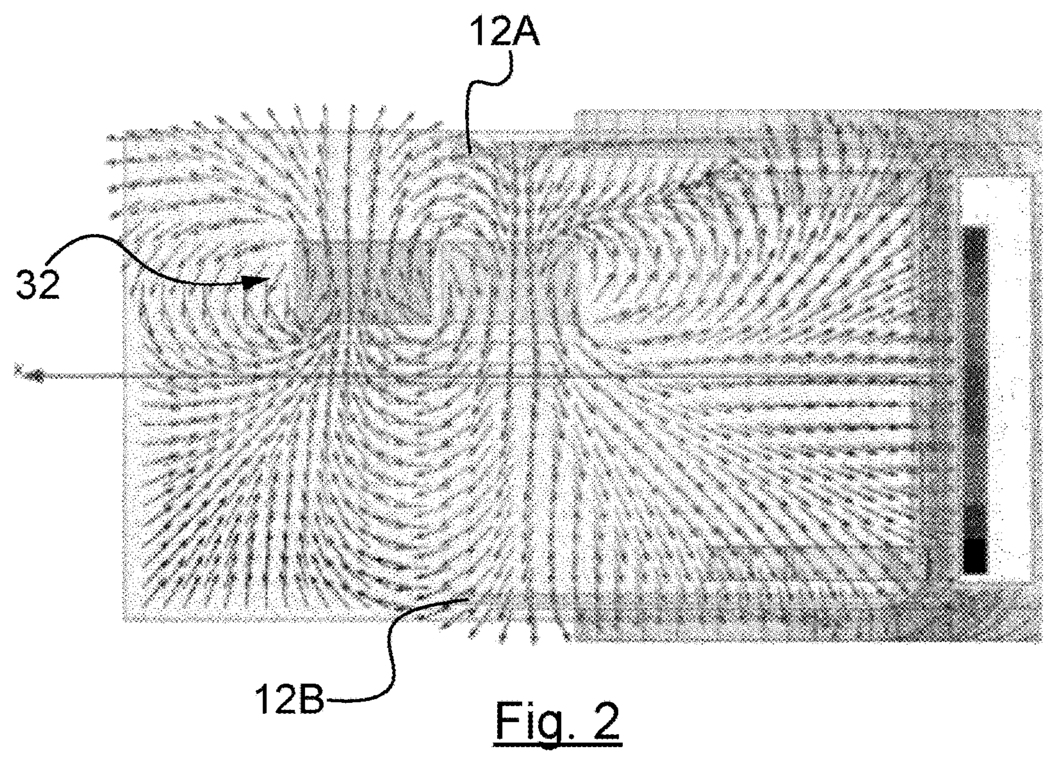
Figure 3:
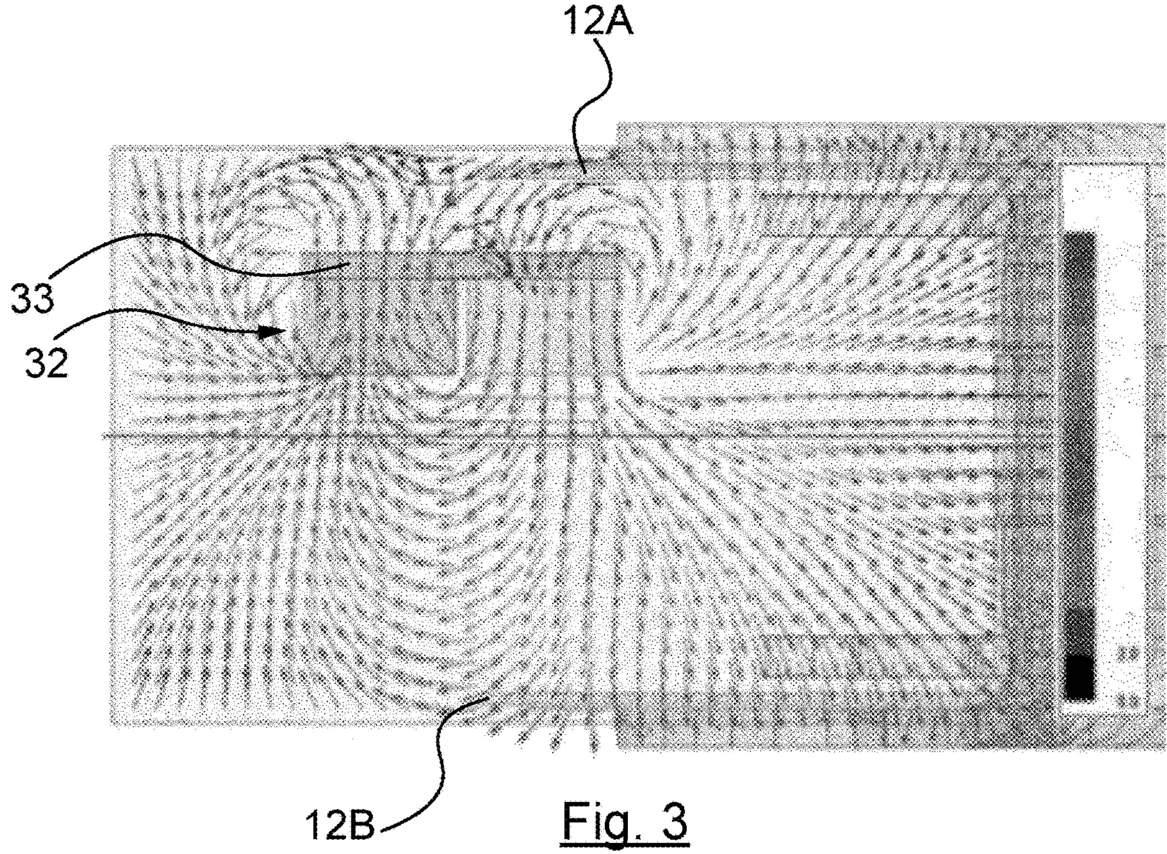
Figure 4:
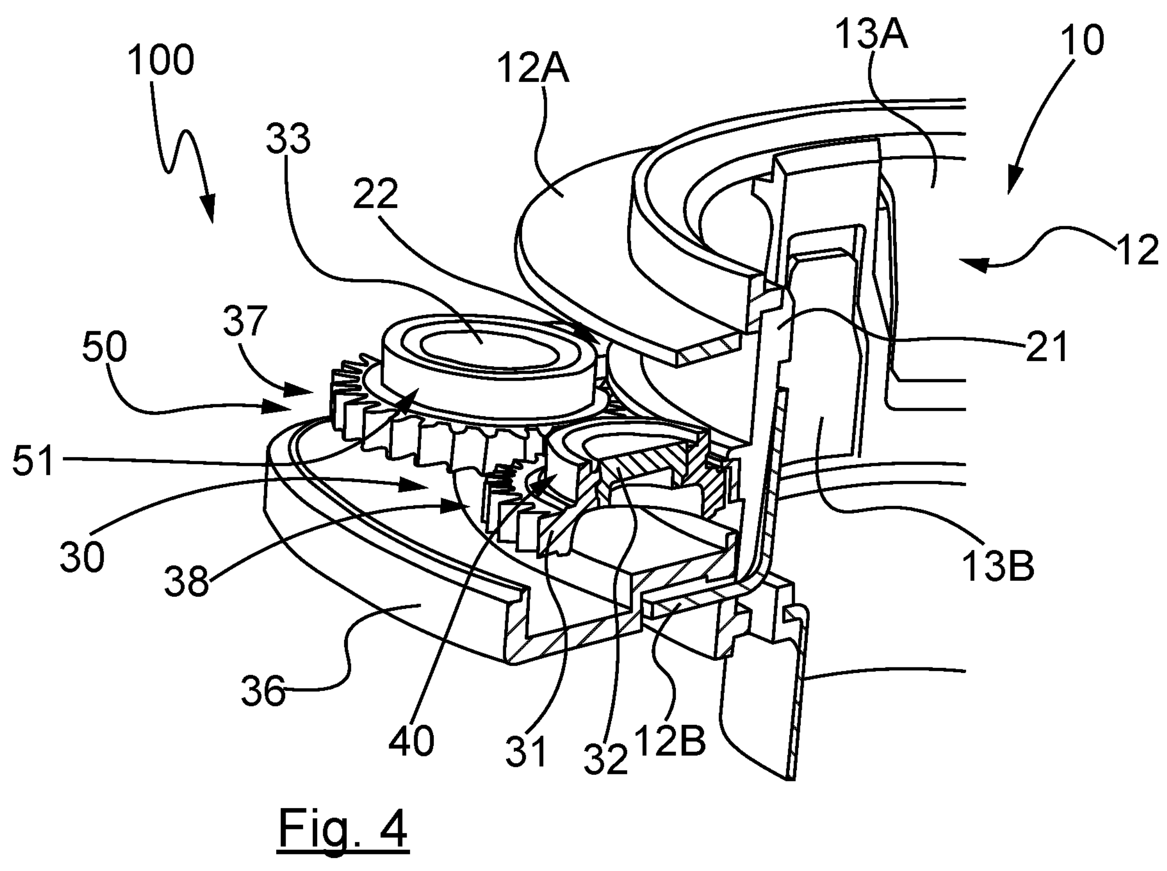
Figure 5:
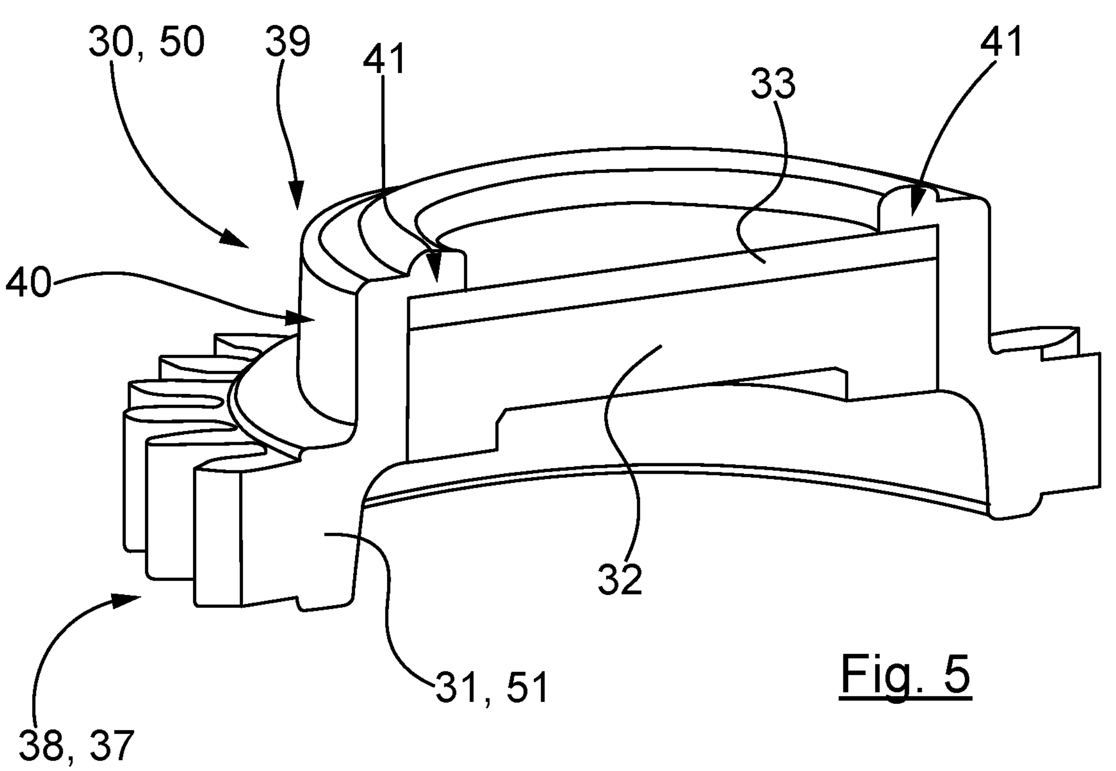
Figure 6:
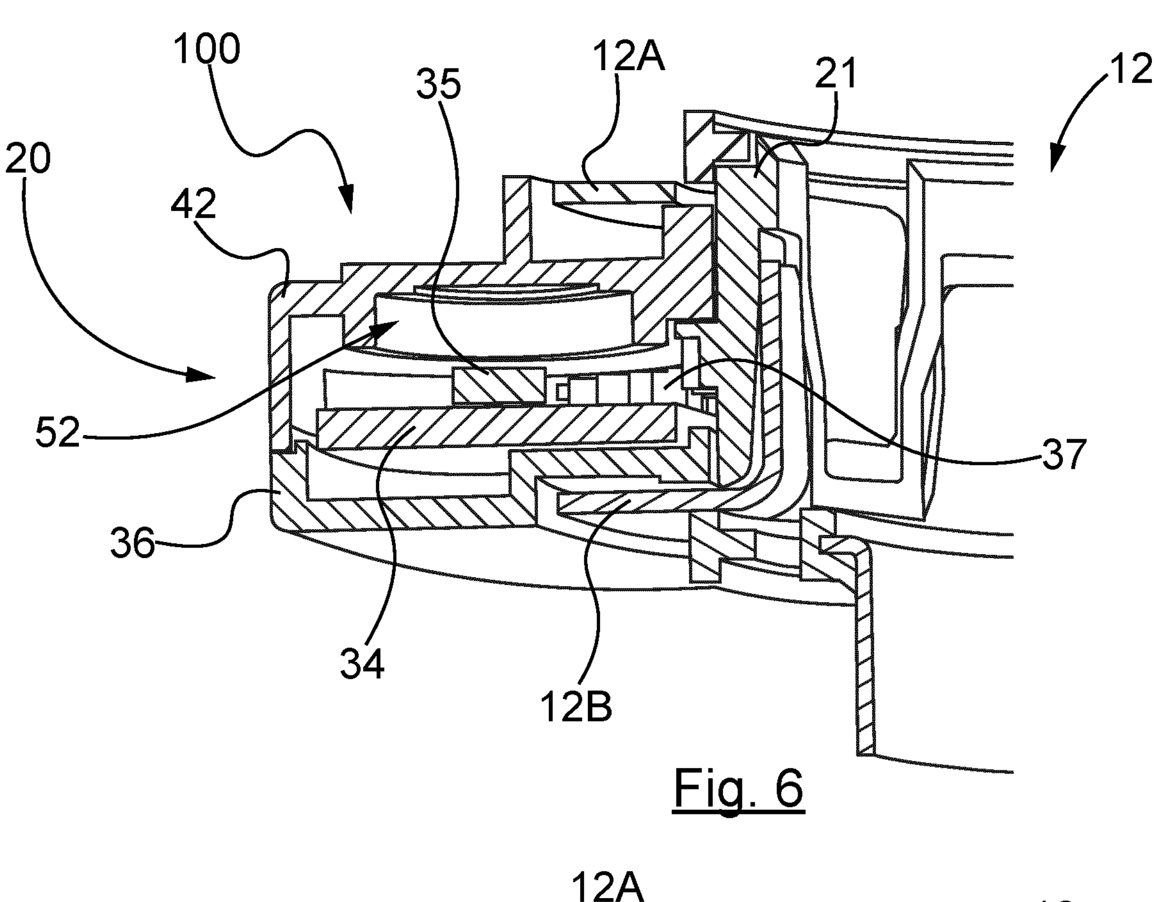
Figure 7:
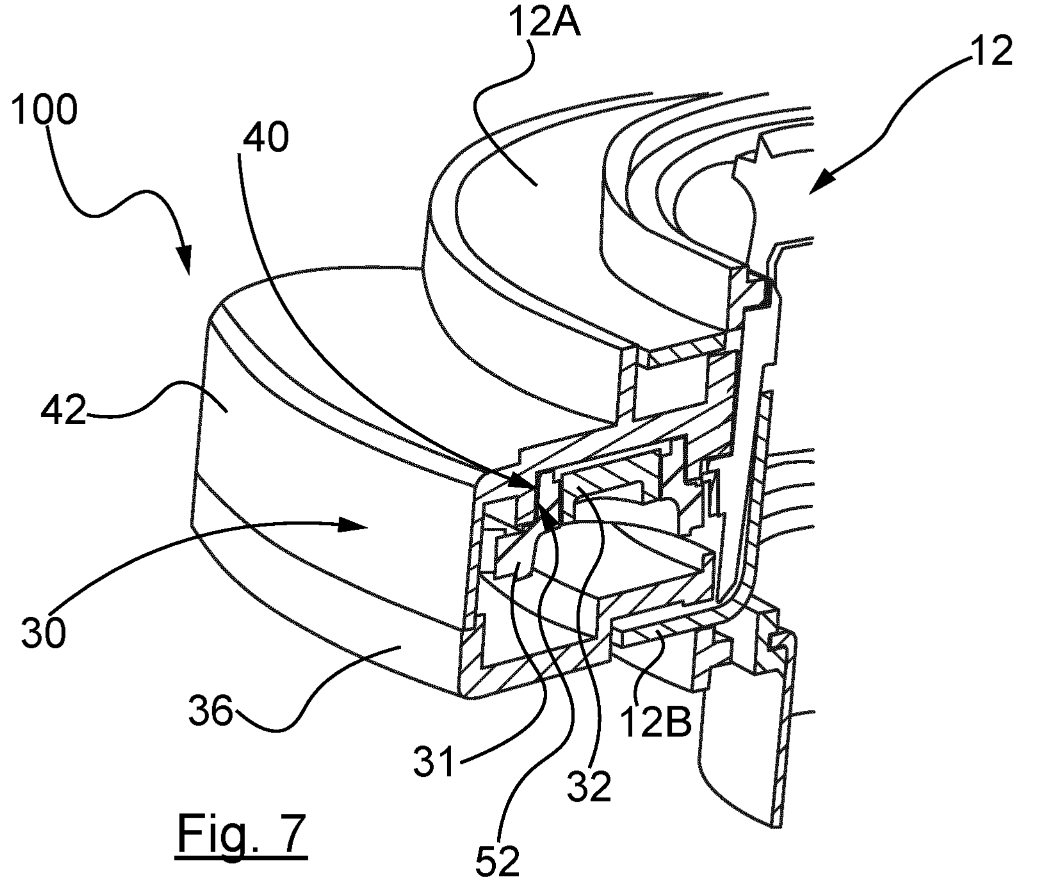
Figure 8:
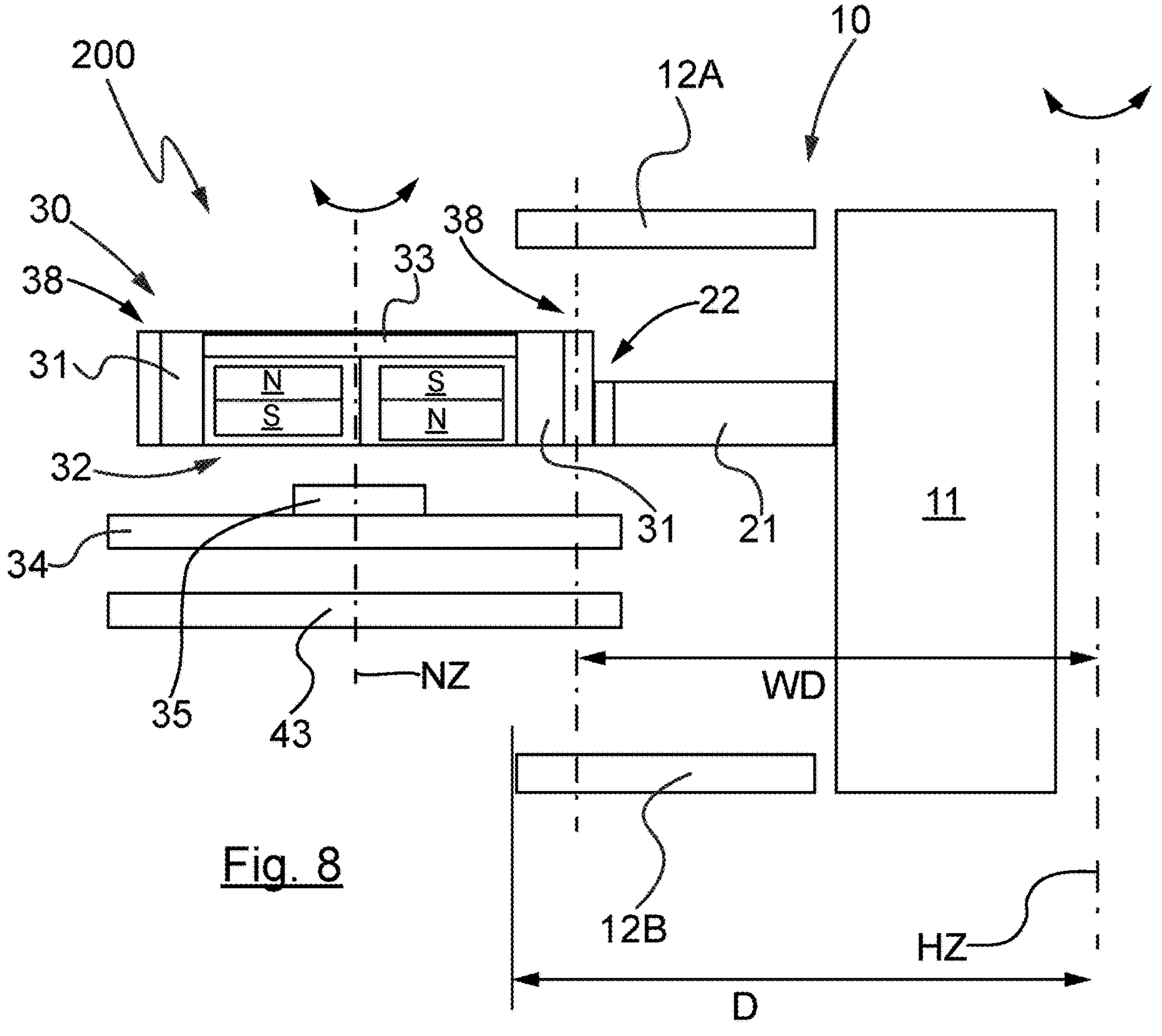

The figures show:

FIG. 1 a schematic representation of a first exemplary embodiment of a sensor device according to the invention with a torque sensor unit and a steering angle sensor unit with a secondary rotor assembly according to the invention, FIG. 2 a false color plot, converted to black and white, of the simulation results of a simulation of the steering angle magnetic field forming in the sensor device according to the invention of FIG. 1 and its scattering into the stator unit of the torque sensor unit without a shielding unit according to the invention, FIG. 3 a comparison of the steering angle magnetic field formed in the sensor device according to the invention in FIG. 1 and its scattering into the stator unit of the torque sensor unit with a shielding unit according to the invention with a shielding element attached for conjoint rotation to the secondary rotor according to the invention, FIG. 4 a first partial section through an assembly with individual components of a sensor device according to the invention as shown in FIG. 1 in perspective view, with a first secondary rotor assembly according to the invention and a second secondary rotor assembly according to the invention, but without the shielding element of the first secondary rotor assembly according to the invention, FIG. 5 a secondary rotor assembly according to the invention in a perspective sectional view showing an individual part, FIG. 6 a second partial section in a further perspective view of a differently composed assembly with other components of the sensor device according to the invention from FIG. 4, but without the first secondary rotor assembly according to the invention, FIG. 7 a third partial section in a further perspective view of a differently composed assembly with other components of the sensor device according to the invention from FIGS. 4 and 6 with a first secondary rotor assembly according to the invention inserted into a housing portion, but without the shielding element according to the invention, and FIG. 8 a schematic illustration of a second exemplary embodiment of a sensor device according to the invention with a secondary rotor assembly according to the invention.

FIG. 1 shows a schematic representation of a first exemplary embodiment of a sensor device 100 according to the invention with a torque sensor device 10 and a steering angle sensor device 20 with a secondary rotor assembly 30 according to the invention.

The torque sensor unit 10 is designed in a manner fundamentally known from the prior art and is set up to detect a torque that is applied to a shaft 11 rotatable about a main axis of rotation HZ, in particular a steering shaft of a motor vehicle. For this purpose, the torque sensor device 10 has at least one torque sensor magnetic unit (not shown) for generating a torque sensor magnetic field and at least one torque magnetic sensor (also not shown) for generating a torque sensor signal as a function of the torque applied to the shaft 11. In addition, the torque sensor unit 10 has, as is known and common in the prior art, a stator unit 12 (cf. FIG. 4) with a first stator and a second stator, of which only the annular stator body 12A or 12B is schematically indicated in FIG. 1. The annular disk-shaped stator bodies 12A and 12B each extend in a plane perpendicular to the main axis of rotation NZ and, in particular, are arranged parallel to one another. Each of the two assigned stators of the torque sensor unit 10 also has corresponding stator lugs 13A and 13B, which extend in an axial direction, i.e., substantially parallel to the main axis of rotation NZ, and which interlock in a toothed manner, see FIG. 4.

The steering angle sensor unit 30 of the sensor device 100 according to the invention is, as is also known in principle from the prior art, set up to detect a rotary angle of the shaft 11 and has a main rotor 21 which is connected for conjoint rotation to the shaft 11 and which in this case has an external gearing 22 for mechanical coupling with a constant and uniform transmission ratio with a first secondary rotor 31, which is part of the secondary rotor assembly 30 according to the invention.

The first secondary rotor 31 has a corresponding external gearing 38, which meshes with the main rotor 21 of the steering angle sensor unit, in particular with its external gearing 22. A steering angle magnetic unit 32 is assigned to the first secondary rotor 31 to generate a first steering angle magnetic field, wherein in this exemplary embodiment the steering angle magnetic unit has 4 poles and is formed in particular by a cylindrical permanent magnet 32. In this example, the four poles N, S are each distributed over two planes and arranged alternately to each other, so that neighboring poles each have a different polarity N, S. To this end, each of the four poles extends over one half of the cylinder both in the radial direction and over the height of the permanent magnet 32.

In this exemplary embodiment, the secondary rotor 31 and the main rotor 21 roll on each other with a pitch circle diameter WD relative to the main axis of rotation HZ, which is smaller than an outer diameter D of the two stator bodies 12A and 12B. A particularly compact design of the sensor device 100 in a radial direction can thus be achieved.

In addition to the steering angle magnetic unit 32, the secondary rotor 31 or the secondary rotor assembly 30 is also assigned a steering angle magnetic sensor 35, which is arranged at a distance from the secondary rotor 31. In this exemplary embodiment, the steering angle magnetic sensor 35 is arranged on a printed circuit board 34 and attached to it. The magnetic sensor 35 is in particular a Hall sensor and preferably designed as a so-called SMD component. The use of an SMD magnetic sensor 35 enables a particularly compact axial design, as it requires very little axial installation space.

The secondary rotor 31 is rotatably mounted in the sensor device 100 about an axis of rotation NZ running parallel to the main axis of rotation HZ and, in particular, is rotatable relative to the steering angle magnetic sensor 35, wherein the steering angle magnetic unit 32 is attached for conjoint rotation to the first secondary rotor 31, i.e., rotating with it. If the secondary rotor 31 rotates due to a rotational movement of the shaft 11 and thus of the main rotor 21, which meshes with the secondary rotor 31, a change is caused in the steering angle magnetic field generated by the steering angle magnetic unit 32, in particular a change in the magnetic flux between the steering angle magnetic unit 32 and the steering angle magnetic sensor 35, which can be detected by the steering angle magnetic sensor 35. In this way, a steering angle sensor signal proportional to the rotary angle of the secondary rotor 31 or a steering angle sensor signal dependent on the rotary angle of the secondary rotor 31 can be generated.

Furthermore, the sensor device 100 also has a magnetic shielding unit 33 in order to magnetically shield the steering angle sensor unit 30 arranged in the axial direction between the two stator bodies 12A and 12B from the stator unit 12 or the torque sensor unit 10, and vice versa.

For this purpose, the shielding unit 33 has a flat shielding element 33 extending in a plane perpendicular to the axis of rotation NZ of the secondary rotor 31, wherein the shielding element 33 is made of ferromagnetic material and, according to the invention, is attached fro conjoint rotation to the secondary rotor 31, i.e., in a manner rotating with it. The shielding element 33 is located on a side of the steering angle magnetic unit 32 facing away from the steering angle magnetic sensor 35.

The attachment, for conjoint rotation, of the shielding element 33 to the secondary rotor 31 according to the invention can reduce mutual disturbing magnetic interference, in particular the scattering of a part of the steering angle magnetic field generated by the steering angle magnetic unit 32, into the stator unit 12, in particular into the two stator bodies 12A to 12B, and can even be almost completely or completely avoided if the shielding unit 33 is suitably designed. In particular, a scattering of the steering angle magnetic field into the upper stator body 12A can be significantly reduced. FIGS. 2 and 3 show how well the scattering in the upper stator body 12A can be reduced.

By means of the shielding element 33 according to the invention, sufficiently good shielding can be achieved even in the case of an arrangement of the secondary rotor assembly 30 or the steering angle magnetic unit 32 lying far inwards in the radial direction, in particular also in the case of an arrangement with a pitch circle diameter WD which is smaller than an outer diameter D of the stator bodies 12A and 12B.

In addition, in many cases the useful field of the steering angle magnetic unit 32 can be improved by the particularly close arrangement of the shielding element 33 to the steering angle magnetic unit 32 that can be achieved in this way. In particular, a more favorable operating point of the steering angle magnetic unit 32 can be achieved, whereby a stronger first steering angle magnetic field can be realized with the same volume or spatial requirement of the steering angle magnetic unit 32. At the same time, a higher stability of the steering angle magnetic unit 32 against demagnetization or aging can also be achieved.

FIG. 2 shows a false color plot, converted to black and white, of the simulation results of a simulation of the steering angle magnetic field forming in the sensor device 100 according to the invention of FIG. 1 and its scattering into the stator unit 12 of the torque sensor unit 10 without a shielding unit 33 according to the invention.

In FIG. 3, by comparison, the steering angle magnetic field formed in the sensor device 100 according to the invention of FIG. 1 and its scattering into the stator unit 12 of the torque sensor device 10 with a shielding device according to the invention with a shielding element 33 attached for conjoint rotation to the secondary rotor 31 according to the invention is shown, wherein the lesser scattering of the magnetic field generated by the steering angle magnetic unit 32 into the upper stator body 12A is clearly recognisable from FIG. 3. This can significantly reduce the interference of the steering angle magnetic field on the torque sensor unit 10.

The attachment, for conjoint rotation, of the shielding element 33 to the secondary rotor 31 according to the invention, in particular directly on the permanent magnet 32, in particular without a spacing or an air gap between them, enables a particularly space-saving axial configuration of the steering angle sensor unit 20.

This allows the steering angle sensor unit 20 to be positioned between the two stator bodies 12A and 12B, particularly in the axial direction, while still achieving good shielding.

FIG. 4 shows a first partial section through an assembly with individual components of a sensor device 100 according to the invention as shown in FIG. 1 in perspective view, with a first secondary rotor assembly 30 according to the invention and a second secondary rotor assembly 50 according to the invention, but without the shielding element 33 of the first secondary rotor assembly 30 according to the invention.

The second secondary rotor assembly 50 has a second secondary rotor 51, which also meshes with the main rotor 21, in particular its external gearing 22, via an external gearing 37 and is coupled to the main rotor 21 in this way. The second secondary rotor 51 or the second secondary rotor assembly 50 is different from a first transmission ratio, with which the first secondary rotor 31 is coupled to the main rotor 21, in order to enable a particularly advantageous detection of a rotary angle applied to the shaft 11, in particular an accurate detection of the rotary angle.

In this exemplary embodiment, the second secondary rotor assembly 50 is also designed according to the invention, wherein the second secondary rotor assembly 50 likewise has an assigned, but not recognizably shown, steering angle magnetic unit to generate a second steering angle magnetic field and a steering angle magnetic sensor which is assigned to the second secondary rotor 51, also not recognizably shown, to generate at least one second steering angle sensor signal as a function of the rotary angle of the main rotor 21.

The second secondary rotor 51 is likewise rotatable relative to the assigned steering angle magnetic sensor about an assigned axis of rotation NZ, which runs parallel to the main axis of rotation HZ, while the assigned steering angle magnetic unit is also connected for conjoint rotation to the second secondary rotor 51.

In this case, the shielding unit of the sensor device 100 according to the invention, in particular the steering angle sensor unit 30, has two magnetic shielding elements 33 in order to shield the torque sensor magnetic field of the torque sensor unit 10 and the corresponding steering angle magnetic fields of the steering angle sensor unit 20 at least partially from one another. For this purpose, on the second secondary rotor 51, a magnetic, flat shielding element 33 extending in a plane perpendicular to the axis of rotation NZ of the second secondary rotor 51 is also attached for conjoint rotation to the second secondary rotor 51 on the side facing away from the second steering angle magnetic sensor.

FIG. 5 shows an auxiliary rotor assembly 30 or 50 according to the invention in a single-part representation in a perspective section, wherein in this representation the arrangement, for conjoint rotation, of the flat shielding element 33 in the auxiliary rotor assembly 30 or 50 according to the invention is clearly recognisable, wherein in this exemplary embodiment the flat shielding element 33 rests in particular directly on the associated steering angle magnetic unit 32, which is designed in particular as a permanent magnet, and together with the permanent magnet, and is integrated together with the permanent magnet 32 in the secondary rotor 31.

As can also be clearly seen from this illustration, the secondary rotor 31 or 51 has a hollow-cylindrical shaft 39 with an outer surface 40, which forms a bearing surface for guiding the secondary rotor 31 in the radial direction during a rotation about the assigned axis of rotation NZ of the secondary rotor 31 or 50 for the rotatable mounting of the secondary rotor 31 or 50 within the sensor device 100.

In this example, the steering angle magnetic unit 32 is arranged together with the flat shielding element 33 inside the shaft 39, in particular concentrically to the shaft 39.

The secondary rotor 31 or 51 is preferably made of a plastic that is neither electrically conductive nor magnetically conductive, in particular by injection molding, wherein the secondary rotor 31 is produced in particular by simultaneous overmolding of the permanent magnet 32 and of the flat shielding element 33, so that the secondary rotor assembly 30 or 50 is thus an integrally formed 3-part component, in particular made of three different materials. For a good fixing of the shielding element 33 and also additionally of the permanent magnet 32 in the axial direction, the secondary rotor 31 also has in particular an axial stop 41, which in this example is formed by a projection 41 or a shoulder 41 extending radially inwards.

In this exemplary embodiment of a secondary rotor assembly 30 or 50 according to the invention, the shielding element 33 is in particular a ferromagnetic shielding plate 33. This makes it particularly easy to produce a compact secondary rotor assembly 30 or 50 and to provide it with particularly good shielding properties.

Alternatively, however, the shielding element 33 and the magnet device 32 can also each be produced as an injection-molded component, in which case, however, a plastic filled with magnetic, in particular ferromagnetic, particles and thus a magnetically shielding or magnetic or magnetizable plastic is preferably used, and wherein the steering angle magnetic unit 32 is in particular also suitably magnetized prior to its use in a corresponding steering angle sensor unit 20.

FIG. 6 is a second partial section in a further perspective view of a differently composed assembly with other components of the sensor device 100 according to the invention from FIG. 4, but without the first secondary rotor assembly 30 according to the invention.

This illustration clearly shows the compact design of a sensor device 100 according to the invention, in particular the arrangement of the steering angle sensor unit 20 between the stator bodies 12A and 12B in the axial direction and the resulting compact radial design of the sensor device 100.

In the exemplary embodiment of a sensor device 100 according to the invention shown in FIG. 6, the sensor device 100 further comprises a housing portion with an upper housing part 42 and a lower housing part 36, in which the printed circuit board 34 with the steering angle magnetic sensor 35 attached thereto and the two secondary rotor assemblies 30 (not shown in this figure) and 50 can be inserted or are inserted.

The upper housing part 42 is designed to support the secondary rotor assembly 30 or 50, in particular the first secondary rotor 31 or the second secondary rotor 51 by means of a sliding bearing in the radial direction, wherein a corresponding sliding bearing surface 52 is provided on the upper housing part 42 for this purpose.

The printed circuit board 34 with the steering angle magnetic sensor 35 attached to it is preferably inserted into the lower housing part 36 and attached to it, for example by latching, clipping, caulking or the like.

FIG. 7 shows a third partial section in a further perspective view of a differently composed assembly with other components of the sensor device 100 according to the invention from FIGS. 4 and 6 with a first secondary rotor assembly 30 according to the invention inserted into a housing portion 36, 42, but without the shielding element 33 according to the invention, wherein the sliding bearing of the first secondary rotor assembly 30 in the upper housing portion 42 is clearly recognizable from this representation.

The secondary rotor 31 forms a plain bearing together with the upper housing part 42, wherein in particular the outer surface 40 of the shaft 39, which forms the bearing surface 40 on the secondary rotor side, and the bearing surface 52 in the upper housing part 42 form the plain bearing.

FIG. 8 shows a schematic representation of a second exemplary embodiment of a sensor device 200 according to the invention with a secondary rotor assembly 30 according to the invention, wherein in this exemplary embodiment of a sensor device 200 according to the invention a further shielding element 43 is additionally provided, which is likewise flat and extends in a plane perpendicular to the main axis of rotation HZ or to the axis of rotation NZ of the secondary rotor 31 or of the secondary rotor assembly 30.

This shielding element 43 is preferably likewise made from a ferromagnetic sheet. For particularly good shielding, this further shielding element 43 is arranged below the printed circuit board 34 in this exemplary embodiment 200, in particular on a side of the printed circuit board 34 facing away from the steering angle magnetic sensor 35. In this way, an influence on the steering angle magnetic sensor 35 from below or a disturbing influence by a stray field component of the steering angle magnetic field can be reduced, especially in the lower stator body 12B. As a result, the shielding can be improved even further.

In this exemplary embodiment, the shielding elements 33 and 43 are each designed and in particular matched to the torque sensor unit 10 in such a way that the stray field components of the steering angle magnetic field, which are introduced into the stator bodies 12A and 12B, are formed in magnitude and direction in such a way that they cancel each other out within the stator unit 12, so that as a result no disturbing influence of the torque sensor unit 10 by the steering angle magnetic field occurs in the stator unit. Particularly good sensor accuracy can be achieved by this means.

Besides the described possible embodiments, a large number of further modifications, in particular in terms of design, are possible without departing from the scope of protection defined by the patent claims.

LIST OF REFERENCE SIGNS

100, 200 sensor device according to the invention
10 torque sensor unit
20 steering angle sensor unit
11 shaft
12 stator unit
12A, 12B annular disk-shaped stator body
13A, 13B stator lugs
21 main rotor
22 external gearing of the main rotor

30 first secondary rotor assembly according to the invention
31 first secondary rotor
32 first steering angle magnetic unit, in particular 4-pole permanent magnet
33 shielding element
34 printed circuit board
35 steering angle magnetic sensor
36 lower housing part
37 external gearing of the second secondary rotor
38 external gearing of the first secondary rotor
39 shaft of the secondary rotor
40 outer surface on the shaft of the secondary rotor, bearing surface
41 axial stop
42 upper housing part
43 further shielding element
50 second secondary rotor assembly according to the invention
51 second secondary rotor
52 bearing surface in the upper housing part
D outer diameter of stator body
HZ main axis of rotation
NZ axis of rotation of the secondary rotor
WD pitch circle diameter of the main rotor

The invention claimed is:

1. A sensor device having comprising:

a torque sensor unit; and a steering angle sensor unit for a motor vehicle, wherein the torque sensor unit is configured to detect a torque which is applied to a steering shaft, rotatable about a main axis of rotation, and wherein the torque sensor unit comprises at least one torque sensor magnetic unit to generate a torque sensor magnetic field and at least one torque magnetic sensor to generate a torque sensor signal as a function of a torque applied to the shaft, wherein the steering angle sensor unit is configured to detect a rotary angle of the shaft, and wherein the steering angle sensor unit comprises:

a main rotor which is able to be connected for conjoint rotation to the shaft, a first secondary rotor which is mechanically coupled to the main rotor with a constant and uniform first transmission ratio, a first steering angle magnetic unit which is assigned to the first secondary rotor to generate a first steering angle magnetic field, and a first steering angle magnetic sensor which is assigned to the first secondary rotor to generate at least one first sensor signal as a function of an rotary angle of the main rotor, wherein the first secondary rotor is rotatable relative to the first steering angle magnetic sensor about a first axis of rotation running parallel to the main axis of rotation and the first steering angle magnetic unit is connected for conjoint rotation to the first secondary rotor; and a magnetic shielding unit with at least one first flat magnetic shielding element which extends in a plane perpendicular to the first axis of rotation, in order to shield the torque sensor magnetic field of the torque sensor unit and the first steering angle magnetic field of the steering angle sensor unit at least partially from one another, wherein the first shielding element is arranged in the axial direction on a side of the first steering angle magnetic unit facing away from the first steering angle magnetic sensor, wherein the first magnetic shielding element is attached for conjoint rotation to the first secondary rotor.

2. The sensor device as claimed in claim 1, wherein the steering angle sensor unit further comprises:

at least one second secondary rotor mechanically coupled to the main rotor with a constant and uniform transmission ratio, a second steering angle magnetic unit which is assigned to the second secondary rotor to generate a second steering angle magnetic field, and a second steering angle magnetic sensor which is assigned to the second secondary rotor to generate at least one second sensor signal as a function of a rotary angle of the main rotor, wherein the second secondary rotor is rotatable relative to the second steering angle magnetic sensor about a second axis of rotation running parallel to the main axis of rotation and the second steering angle magnetic unit is connected for conjoint rotation to the second secondary rotor, wherein the magnetic shielding unit further comprises at least one flat second magnetic shielding element extending in a plane perpendicular to the second axis of rotation in order to shield the torque sensor magnetic field of the torque sensor unit and the second steering angle magnetic field of the steering angle sensor unit at least partially from one another, wherein the second magnetic shielding element is arranged in the axial direction on a side of the second steering angle magnetic unit facing away from the second steering angle magnetic sensor and is attached for conjoint rotation to the second secondary rotor.

3. The sensor device as claimed in claim 1, wherein at least one steering angle magnetic unit comprises a 4-pole, cylindrical, permanent magnet or is such a permanent magnet, wherein the permanent magnet is arranged concentrically to the assigned axis of rotation of the secondary rotor and the four poles of the permanent magnet are distributed on two planes and the four poles are each arranged in such a way that adjacent poles each have a different polarity.

4. The sensor device as claimed in claim 1, wherein at least one air gap in the axial direction along the axis of rotation of a secondary rotor between at least one steering angle magnetic unit and the assigned flat shielding element is 0 mm.

5. The sensor device as claimed in claim 1, wherein at least one secondary rotor comprises a hollow-cylindrical shaft, wherein the assigned steering angle magnetic unit is arranged at least partially in the interior of the shaft, and wherein an outer surface of the shaft forms at least partially a bearing surface for the rotatable mounting of the secondary rotor within the sensor device for guiding the secondary rotor in the radial direction during a rotation about the assigned axis of rotation of the secondary rotor.

6. The sensor device as claimed in claim 5, wherein at least one secondary rotor comprises at least one axial stop at an end of the shaft facing away from the assigned steering angle magnetic sensor, wherein the assigned shielding element is arranged between the axial stop and the assigned steering angle magnetic unit arranged in the interior of the shaft.

7. The sensor device as claimed in claim 6, wherein the axial stop is formed by a projection extending inwards in the radial direction or by a shoulder of a groove formed in the radial direction in an inner surface of the shaft.

8. The sensor device as claimed in claim 1, wherein at least one secondary rotor is made of plastic and is produced by injection molding, wherein the assigned shielding element or the assigned steering angle magnetic unit are connected to the secondary rotor for conjoint rotation by at least partial overmolding or latching and form a secondary rotor assembly with the secondary rotor.

9. The sensor device as claimed in claim 1, wherein the steering angle sensor unit, further comprises a housing portion which at least partially surrounds the steering angle sensor unit, wherein the secondary rotor is mounted in the housing portion rotatably about the assigned axis of rotation via the outer surface of the shaft, which at least partially forms the bearing surface.

10. The sensor device as claimed in claim 1, wherein the sensor device further comprises at least one further shielding element which is arranged in the axial direction on a side of at least one steering angle magnetic sensor facing away from at least one steering angle magnetic unit or a further shielding element is arranged in the axial direction on a side of the first steering angle magnetic unit facing away from the first steering angle magnetic sensor.

11. The sensor device as claimed in claim 1, wherein the torque sensor unit comprises a stator unit with a first stator and a second stator, wherein each stator comprises an annular disc-shaped stator body which extends in the radial direction in a plane perpendicular to the main axis of rotation, wherein at least one shielding element is arranged in the axial direction between the stator bodies of the two stators.

12. The sensor device as claimed in claim 11, wherein the main rotor and the at least one secondary rotor roll on each other and a pitch circle diameter of the main rotor is smaller than an outer diameter of at least one stator body.

13. The sensor device as claimed in claim 11, wherein the first shielding element, the second shielding element, or at least one further shielding element, is configured in such a way that the magnetic field lines of a stray magnetic field which is generated by the steering angle magnetic unit and which strays into the stator unit is configured in magnitude and direction and is introduced into the stator unit in such a way that the stray magnetic field component which is introduced into the first stator and the stray magnetic field component which is introduced into the second stator cancel each other out in the torque sensor unit completely.

14. A secondary rotor assembly for a sensor device as claimed in claim 1, wherein the secondary rotor assembly comprises:

a secondary rotor, a steering angle magnetic unit connected for conjoint rotation to the secondary rotor to generate a steering angle magnetic field, and a magnetic shielding unit having at least one flat magnetic shielding element which extends in a plane perpendicular to the axis of rotation of the secondary rotor, wherein the magnetic shielding element is arranged in the axial direction on a side of the steering angle magnetic unit which faces away from a side provided for the arrangement of a steering angle magnetic sensor, and is attached for conjoint rotation to the secondary rotor.

* * * * *